United States Patent [19]

Lahut et al.

[11] Patent Number: 4,496,962

[45] Date of Patent: Jan. 29, 1985

[54] HIGH RESOLUTION MAGNETIC PRINTING HEAD

[75] Inventors: Joseph A. Lahut; John A. Popelish, both of Waynesboro, Va.

[73] Assignee: General Electric Company, Waynesboro, Va.

[21] Appl. No.: 218,890

[22] Filed: Dec. 22, 1980

[51] Int. Cl.[3] .............................................. G01D 15/12

[52] U.S. Cl. .................................................... 346/74.5

[58] Field of Search ................ 346/74.5; 101/DIG. 5; 360/123-127

[56] References Cited

U.S. PATENT DOCUMENTS

| | | | |
|---|---|---|---|
| 3,156,819 | 10/1964 | Rutter | 346/74.5 |
| 3,221,314 | 11/1965 | Sims, Jr. | 346/74.5 |
| 3,624,661 | 11/1971 | Shebanow et al. | 346/74.5 |
| 4,001,841 | 1/1977 | Berkowitz | 346/74.5 |
| 4,097,871 | 6/1978 | Berkowitz et al. | 346/74.5 |

*Primary Examiner*—Thomas H. Tarcza
*Attorney, Agent, or Firm*—Michael Masnik

[57] ABSTRACT

In order to increase the resolution and visual quality of the image produced by the transverse magnetic imaging technique, a magnetic printing head has an odd number of stacked elongated comb-type recording head subassemblies which are offset relative to each other in the elongated direction. Individual word and bit coincident current-type conductors are wound the gaps between the teeth of each comb such that unidirectional current will generate in the adjacent gaps of each comb magnetic fields in opposite directions along the length of each comb and such that the magnetic fields in like-ordered gaps of adjacent combs are also in opposite directions. The resultant magnetic image in a magnetic medium moving adjacent the printing head in a direction perpendicular to the lengths of the combs is thus composed of interleaved recordings of alternating directions, which, as compared with single and double comb structures, are spaced much closer together and may be continuously inked with toner on another medium, such as paper, to produce a bolder, higher contrast, and more readable image with a higher image resolution.

7 Claims, 11 Drawing Figures

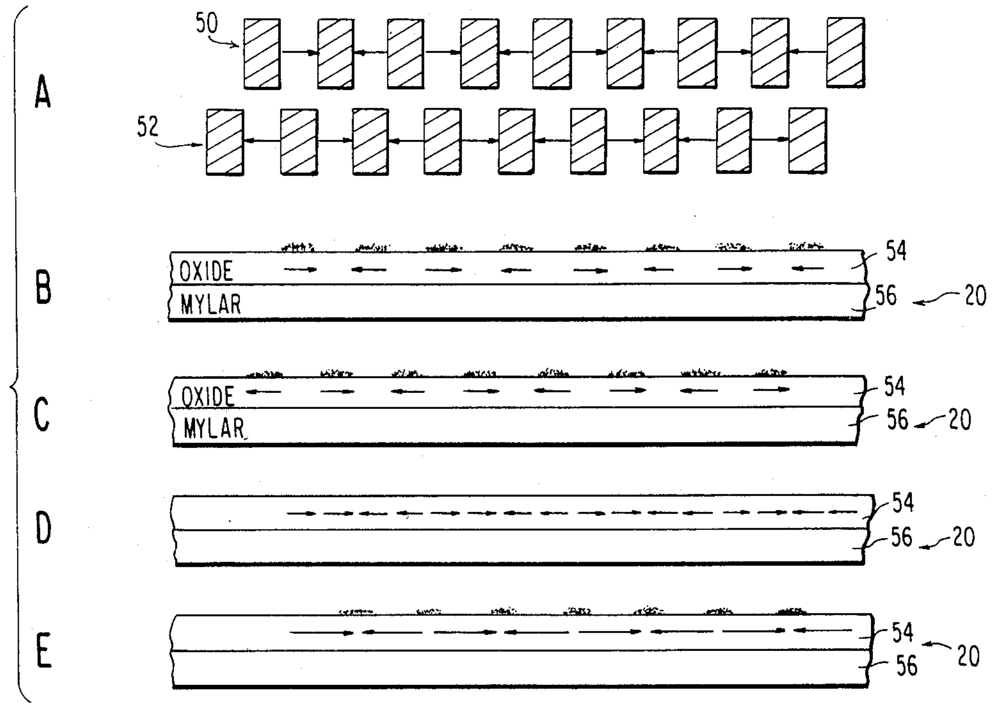
FIG. 5
FIG. 6
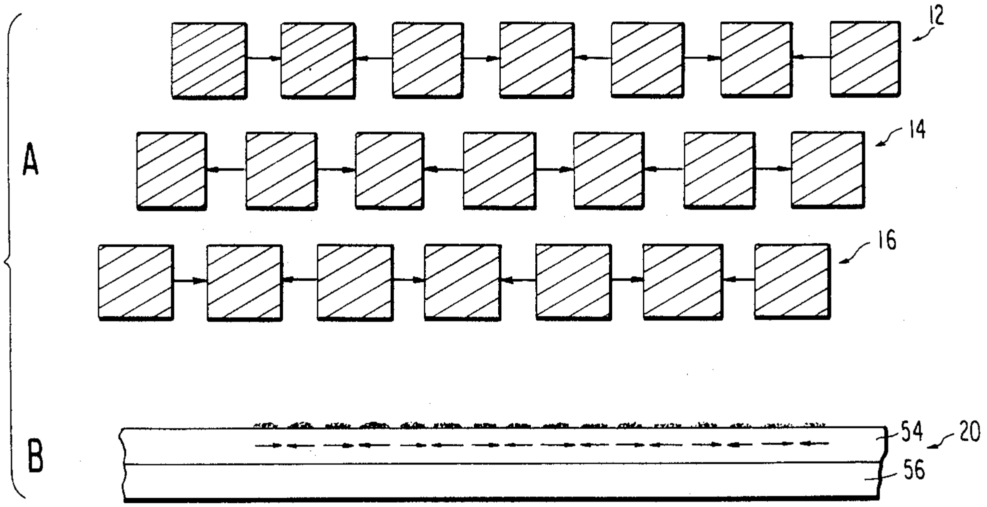

HIGH RESOLUTION MAGNETIC PRINTING HEAD

BACKGROUND OF THE INVENTION

This invention relates to transverse magnetic printing heads and, in particular, to a high resolution magnetic printing head structure having an odd number (greater than one) of high permeability comb members which are offset relative to each other, whereby there is produced in a moving magnetic medium a magnetic image which, when inked by applying toner thereto, produces a visible image having a resolution and quality which is higher than that produced by single and double comb printing heads.

Magnetic printing is an extremely attractive alternative for computer and data communications applications, particularly in comparison to impact printing methods or to ink jet printing methods. Magnetic printing is quiet and rapid, and is extremely flexible in the range of data which may be displayed. Magnetic printers may be employed to produce or reproduce alphanumeric, graphical or pictorial data. In contrast, many high speed impact printers are generally limited to a fixed character set employing a fixed chain or metal or plastic plug.

A detailed description of magnetic printing may be found in U.S. Pat. No. 4,097,871, issued to Berkowitz et al., and which is assigned to the same assignee as the present invention. This patent is expressly incorporated by reference herein. It is to be particularly noted, however, that in a transverse magnetic printing head, the direction of orientation of the magnetic field impressed on the recording medium is perpendicular or transverse to the direction of movement of the medium.

Magnetic printing basically involves the transfer of a dry magnetic ink image from a ferro-magnetic recording medium to a permanent paper medium. To produce on the recording medium the magnetic image which attracts the magnetic ink or toner from a reservoir to the magnetic recording medium in a transverse magnetic printing system, there is provided an elongated magnetic comb structure oriented in a direction transverse or perpendicular to the direction of travel of the magnetic recording medium so that the directions of the recording magnetic fields are also transverse.

The comb itself is composed of material having high magnetic permeability, thereby facilitating concentration of magnetic flux at the tips of the teeth of the comb. Typically, a plurality of current-carrying conductors is threaded through the gaps between the comb teeth, and the current in these conductors controls the level of magnetic flux at the tips of the comb teeth. These current-carrying conductors may be driven independently but, typically and preferable, are configured so as to be driven using coincident current matrix methods, whereby two conductors in the same gap must be carrying current in the same direction in order to generate a magnetic field of sufficient strength to record a magnetic image on the medium.

The region of increased magnetic flux at the comb teeth tips is positioned near the magnetic recording medium to permit the selective magnetization of regions therein which thereafter attract the magnetic ink or toner. In this manner, the currents in the conductors threaded through the teeth of the comb control the patterning of the magnetic ink on the ferro-magnetic recording medium. The ink pattern is later transferred to a paper medium to which the pattern is permanently fixed, and then the magnetic recording medium is subsequently magnetically erased prior to the recording of a new pattern therein.

To achieve high resolution, the magnetic recording must be spaced relatively close together. For example, the teeth of the comb may be spaced apart to form approximately 120 gaps per inch, thereby requiring teeth on 1/120 inch center-to-center spacing. A magnetic printing head structure capable of this high degree of resolution is disclosed, for example, in application Ser. No. 60,921, filed July 26, 1979, refiled as continuation-in-part application Ser. No. 193,398, on Oct. 2, 1980 and issued Jan. 25, 1983 as U.S. Pat. No. 4,370,661 entitled "Easily Assembleable Transverse Magnetic Printing Head", which is assigned to the same assignee as the present invention. This application is hereby incorporated herein by reference. This application describes a magnetic printing head structure in which the teeth of a single, high permeability, magnetic comb structure project through an elongated slot or opening in each of one or more very thin, flexible printed circuit boards. In one embodiment employing two such flexible printed circuit boards, one board carries word line signals, and the other carries bit line signals, thereby enabling the printing head to be operable in a coincident current mode to select comb gaps to produce corresponding recording magnetic fields. Each printed circuit board has printed thereon electrically conductive lines which extend across the slot in the board. These lines typically cross the elongated slots at an angle of approximately 90° relative to the long direction of the slots. It is these printed lines or wires which carry current to magnetically energize selected gaps in the comb. The resulting magnetic flux bridging each selected gap acts to magnetize, in the "transverse" direction, a small portion of the magnetic medium. Because of the extremely small size of both the comb gaps and the electrical conductors which must be threaded through each gap, the resolution of such a magnetic printing head is limited.

Nonetheless, higher print resolutions are desirable to increase the readability and appearance of the printed data. Resolutions of approximately 180 or 360 dots per inch appear to be required for print quality comparable to that of typewritten or conventionally printed material. In addition to these requirements, it is also highly desirable that the printing head be driven in a coincident current matrix fashion. The economies of such a gap selection method are best appreciated by an example. If a 14 inch paper width is employed, then even at a relatively low resolution of 120 gaps per inch, there is required a total of 1,680 gaps. If each gap were to be driven individually, then 1,680 lines would have to be terminated to the electronics, and a suitable edge connector would have to be provided. This problem is even more significant at higher print resolutions. However, by employing coincident current techniques and digit and word line patterns, as specifically described in application Ser. No. 60,921, then a pair of printed circuit boards may be employed, with each circuit board requiring connections for approximately the square root of 1680 circuits.

Another high resolution comb-type magnetic head is disclosed in application Ser. No. 69,233 filed Aug. 27, 1979, refiled as continuation-in-part application Ser. No. 227,863, on Jan. 23, 1981 and issued July 27, 1982 as U.S. Pat. No. 4,342,039 entitled "High Resolution Magnetic Printing Head", and this application is also expressly incorporated herein by reference. This application is also assigned to the same assignee as the present invention, and discloses a high resolution printing head comprising two comb sub-assemblies. Each sub-assembly comprises a high permeability magnetic comb structure disposed through aligned slots in a pair of overlaid, flexible printed circuit boards. The circuit boards have printed thereon electrically conductive lines or leads crossing over the elongated slots at substantially right angles to the length of the slots. The comb structure and conductors are electrically insulated. Additionally, because a flexible printed circuit board is employed, each board may be folded at an approximately 90° angle along a fold line substantially following the line of the elongated slot in the board. A second sub-assembly, substantially equivalent to the first sub-assembly, is then adjacently disposed so as to place the respective magnetic comb structures as close together as possible so that all of the comb teeth in both sub-assemblies are oriented in the same direction. However, the comb structures are aligned so that the teeth of one comb in one sub-assembly are disposed opposite gaps between the comb teeth in the other sub-assembly. In this fashion, the print resolution is doubled. The two sub-assemblies are preferably held together by any convenient mechanical structure which is then surrounded in a moldable composition forming an arched surface which is made flush with the tips of the comb teeth, (for example, by grinding) so as to provide a smooth, non-abrading printing head for placement in close contact with the magnetic recording medium. However, unless complex bi-polar electronic switching circuits are used, the resultant accumulative magnetic flux along the adjacent comb teeth produces a relatively less desirable printed image in which the magnetic ink is distributed in visibly separated dots rather than in a substantially solid pattern.

SUMMARY OF THE INVENTION

Accordingly, it is the broad object of the present invention to provide an improved high resolution magnetic printing head which produces on a magnetic medium a magnetic image which ultimately provides, upon the application of magnetic ink or toner, a visible image of higher quality than that previously obtainable.

A more specific object of the invention is to provide a magnetic print head assembly having an odd plurality of comb-type magnetic printing heads which are offset relative to each other in the direction of their lengths, whereby conventional unidirectional current drive circuits are connected with the windings on the combs to provide oppositely-directed transverse magnetic recording fields, both in adjacent teeth of each comb and also in adjacent like-ordered gaps in adjacent combs.

BRIEF DESCRIPTION OF THE DRAWINGS

FIGS. 5A–5E schematically illustrate the magnetization and toner collection patterns obtained by a double-magnetic comb printing head construction.

FIGS. 6A and 6B illustrate the magnetization and toner collection patterns achieved by the present invention.

DETAILED DESCRIPTION OF THE PREFERRED EMBODIMENTS

Figure 1:
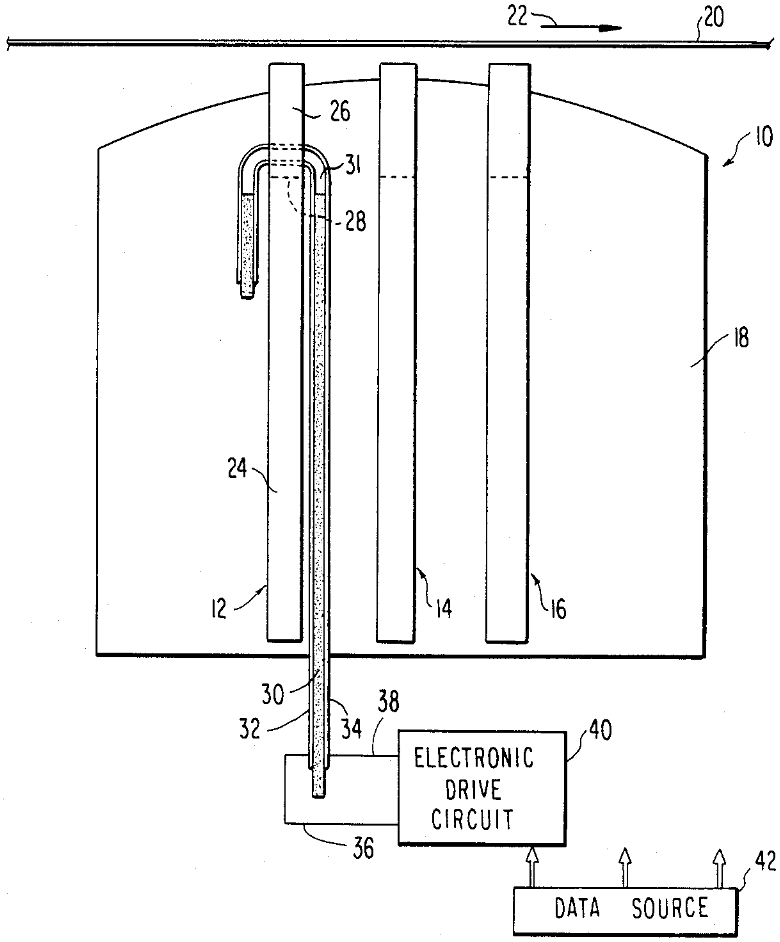
FIG. 1 is a schematic view of a transverse magnetic printing head embodying the invention.

FIG. 1 schematically illustrates a preferred embodiment of the improved magnetic printing head 10 containing three magnetic comb-type head sub-assemblies 12, 14 and 16 potted in epoxy in a head assembly 18. The transverse printing head 10 operates magnetically to print or record a magnetic pattern on a moving magnetic medium, when brought into contact therewith, such as a magnetic tape 20, moving in the direction indicated by the arrow 22. FIG. 1 may be considered a side view of the structure of the head 10, i.e., both the head 10 and the magnetic tape 20 have a depth extending into the paper. Thus, the head 10 magnetically prints across the width of the moving tape 20, i.e., the term, "transverse" magnetic printing head.

The sub-assemblies 12, 14 and 16 are identical, and, thus, only sub-assembly 12 is illustrated in detail.

Sub-assembly 12 comprises an elongated magnetic comb 24 extending into the paper and having a plurality of teeth defining recording gaps therebetween. In FIG. 1 there is illustrated one tooth 26 and one gap 28. Folded over the comb 24 is a very flexible substrate or printed circuit board 30 having an elongated slot 31 therein through which the comb teeth protrude. On one side of the flexible board 30, there is printed a copper word planar circuit 32 and on the other side a copper digit planar circuit 34. These circuits consist of copper lines which extend across the elongated slot 31 in the flexible board 30, and the comb-teeth pass between corresponding adjacent pairs of these lines. Such magnetic combs and flexible printed circuit boards containing planar word and digit circuits are fully disclosed in the patent applications and patent cited above.

The word circuit 32 and the digit circuit 34 are connected via couplings 36 and 38 to a conventional electronic drive circuit 40 to which the data or patterns to be magnetically recorded or printed on tape 20 are applied by a data source 42.

As can be seen from FIG. 1, the three comb sub-assemblies 12, 14 and 16 are stacked in the direction of movement of the magnetic tape 20. A prototype of head 10 has been constructed with a comb-to-comb spacing of 0.058 inch.

Figure 2:
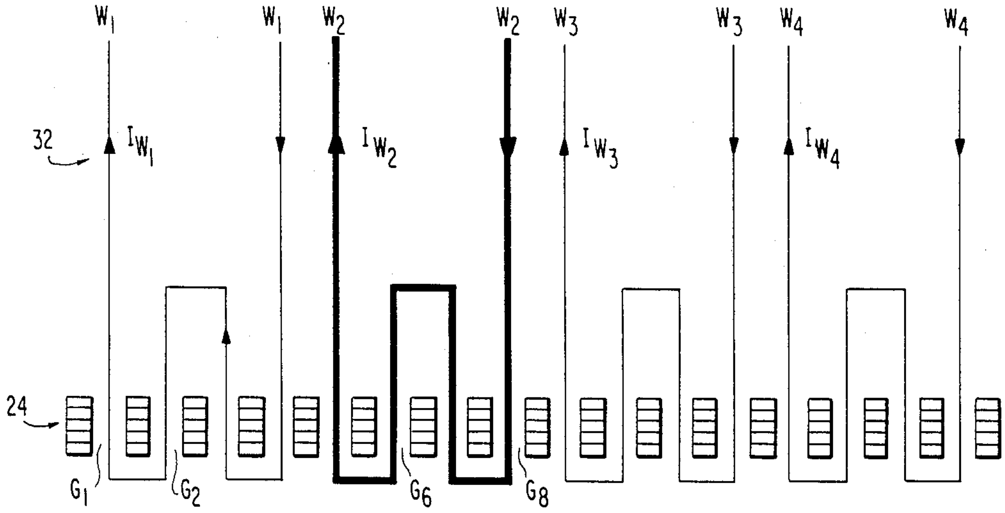
FIGS. 2, 3 and 4 schematically illustrate the planar zig-zag printed circuit as used in the preferred embodiment of the invention.

The aforementioned application Ser. No. 60,921 discloses the planar word and digit printed circuit drive lines which are threaded through the teeth of each comb in a zig-zag fashion. Furthermore, FIG. 2 also schematically shows the planar zig-zag printed word circuit 32 which, here, as an example, consists of four word lines $W_1$, $W_2$, $W_3$ and $W_4$ threaded through a different set of four gaps $G_1$, $G_2$, $G_3$, etc., of the magnetic comb sub-assembly 24. The unidirectional currents $I_{W1}$, $I_{W2}$, $I_{W3}$, and $I_{W4}$ flow in the directions indicated by the arrows on the word lines. It will be seen that the word currents always flow in opposite directions through adjacent gaps, thus providing corresponding magnetic fields in opposite transverse directions in adjacent gaps. As indicated in FIG. 2, as an example, only word line $W_2$ has a unidirectional one-half select current flowing therethrough.

Figure 3:
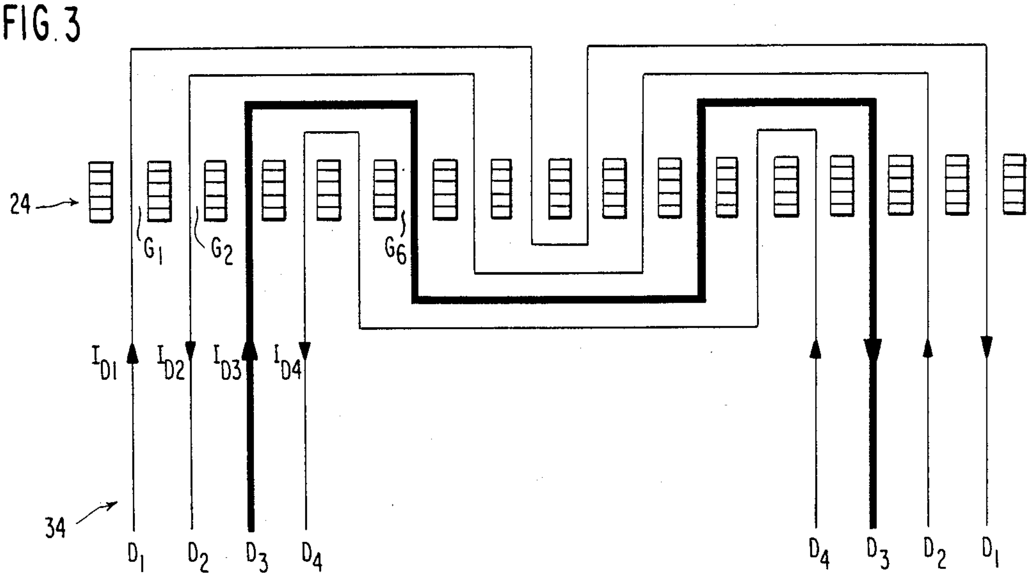

FIG. 3 illustrates, as an example, the corresponding digit printed circuit 34 as consisting of four digit drive lines, $D_1$, $D_2$, $D_3$ and $D_4$. These digit lines are also printed in planar fashion such that no cross-overs occur, and such that the unidirectional currents in adjacent gaps flow in opposite directions. The arrows on the digit lines $I_{D1}$, $I_{D2}$, $I_{D3}$ and $I_{D4}$ indicate the directions of the flow of unidirectional current through these lines.

As indicated above, the word circuit 32 and the digit circuit 34 are printed on opposite sides of the flexible substrate 30 and determine the position of the substrate on the comb 24 by virtue of the fact that the digit and word lines extend across the elongated slot 31 in the substrate 30.

Figure 4:
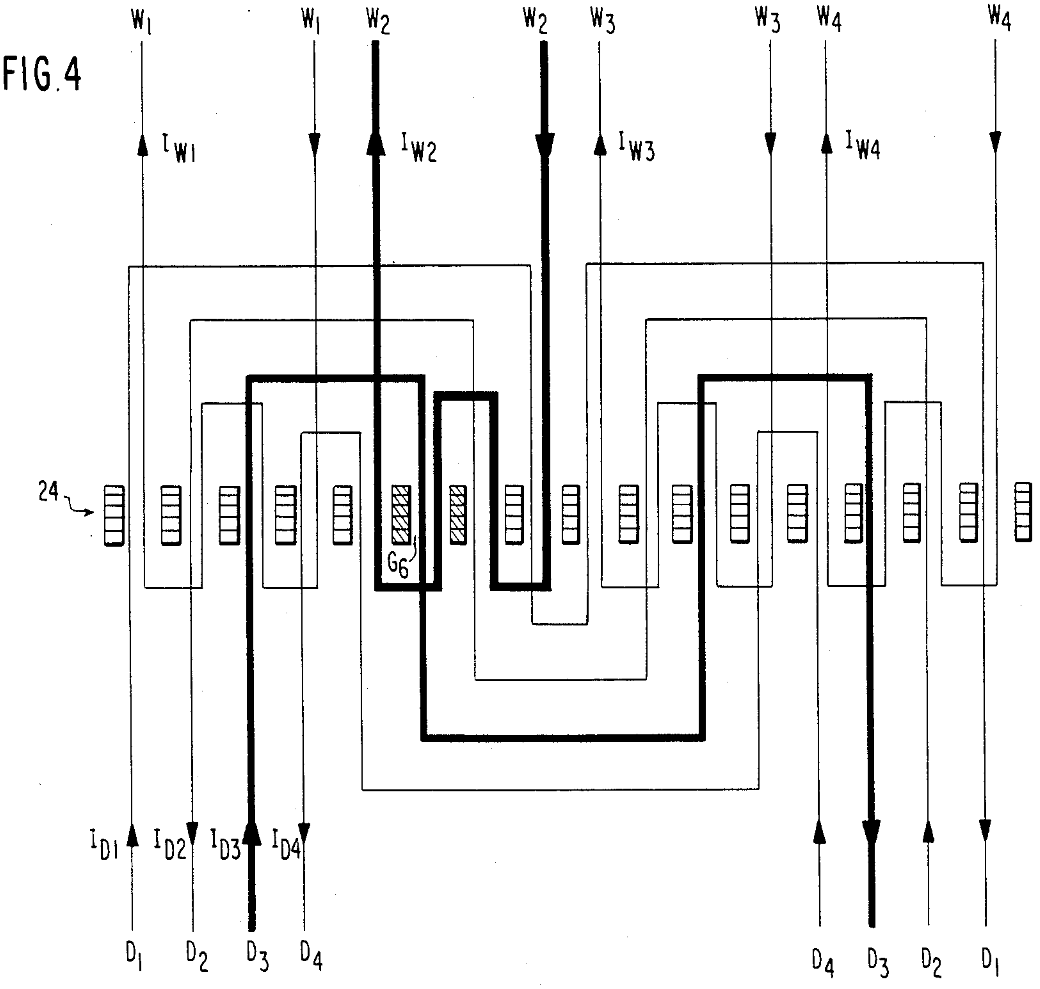

FIG. 4 shows the word circuit 32 and the digit circuit 34 diagrammatically superimposed upon each other in the orientation which occurs when the circuit board 30 is folded upon the magnetic comb 24 as illustrated in FIG. 1. For purposes of illustration, word line $W_2$ and digit line $D_3$ have each been half selected, thereby generating only in gap $G_6$ a transverse magnetic field of sufficient strength to record a magnetic dot at the corresponding position on the magnetic tape 20.

The invention is particularly directed to a transverse magnetic printing head of the type employing the planar zig-zag winding or threading pattern shown in FIGS. 2–4, as such patterns are particularly efficient when using printed circuit techniques. As will become clearer below, for a printing head having three magnetic comb sub-assemblies, the driving currents in the word and digit circuits of the first and third magnetic comb sub-assemblies flow in the direction illustrated in FIGS. 2–3, whereas the driving currents in the corresponding word and drive circuits of the middle comb assembly flow in the opposite directions, respectively. In particular, and with reference to FIG. 1, the drive currents for the magnetic comb sub-assemblies 12 and 16 flow in the direction illustrated in FIGS. 2–4, while the drive currents for magnetic comb sub-assembly 14 flow in the opposite directions. In general, when the odd number of the plurality of magnetic comb sub-assemblies is greater than three, the drive currents flow in the same direction in alternate sub-assemblies, and in opposite directions in adjacent sub-assemblies.

In order to better appreciate the problems solved by the improved magnetic printing head employing an odd plurality of magnetic comb sub-assemblies using the planar zig-zag drive circuits described above, the reader is referred to FIG. 5A–E which schematically show a magnetic printing head employing an even number, e.g., two, of magnetic comb sub-assemblies. FIG. 5A schematically illustrates a set 50 of the teeth of a first magnetic comb, and a set 52 of the teeth of a second magnetic comb offset relative to the first magnetic comb in the "transverse" direction. The arrows in the gaps between the teeth in the two combs indicate the opposite transverse directions of the magnetic fields generated by the planar zig-zag winding patterns of the drive circuits as described above.

FIG. 5B illustrates by arrows the corresponding opposite directions of magnetizations formed in the oxide layer 54 formed on a mylar substrate 56 of the magnetic tape 20. On the top of the oxide layer 54 is illustrated the magnetic toner collection pattern which will be formed by these magnetizations produced by the magnetic fields.

FIG. 5C similarly shows the magnetizations and toner collection patterns which would be produced only by the magnetic teeth 52 of the second magnetic comb. FIG. 5D illustrates the sum of the magnetization patterns of FIGS. 5B and 5C.

FIG. 5E illustrates the equivalent magnetization pattern formed in the oxide layer 54, and also the resultant toner collection pattern of the successive recordings of both heads 50 and 52. Since the resultant magnetization pattern of FIG. 5D shows that the magnetization pattern consists of adjacent pairs of magnetizations having opposite transverse directions, but in which the individual magnetizations of each pair are in the same direction, the two individual magnetizations of each pair actually produce a single resultant magnetization in the same direction but of a longer length. As indicated in FIG. 5E, the toner collection pattern actually consists of a series of separated dots of toner concentrated at points corresponding to a change in the direction of the magnetization patterns, rather than being evenly distributed along the magnetization patterns. This undesirable toner collection pattern occurs because, as magnetic recordings exceed approximately 0.004 inch in length, the toner tends to collect at the end of each recording, i.e., at the points corresponding to a reversal in the direction of magnetization. This concentration of toner occurs because the toner is attracted to the highest magnetic field and field gradients which occur at the ends of each magnetic recording.

In contrast, FIG. 6B illustrates the substantially continuous toner collection pattern achieved by the improved magnetic printing head of this invention. More particularly, FIG. 6A schematically illustrates the orientation of the ends of the three sets of teeth and corresponding recording gaps formed by the three transversely offset magnetic comb sub-assemblies 12,14 and 16 of FIG. 1. Again, it is assumed that the three magnetic comb sub-assemblies are threaded with the planar zig-zag drive line patterns shown in FIGS. 2–4 with the corresponding drive currents for sub-assemblies 12 and 16 flowing through the gaps in the same directions, and the corresponding drive currents for the middle sub-assembly 14 flowing in the opposite directions, thereby producing the pattern of magnetization directions as indicated by the arrows illustrated in the gaps between the teeth of the three sub-assemblies. The resulting magnetization pattern in the oxide layer 54, then, consists of adjacent magnetic recordings which are always in the opposite transverse direction, and there is no accumulation of flux between adjacent recordings. In other words, each of the recording is toned individually and is short enough to tone continuously. The toner collection pattern on the surface of the oxide layer 54 tends to be continuous, rather than a series of spaced dots as shown in FIG. 5E. Thus, for any particular dot density the triple offset head schematically illustrated in FIG. 6A requires one-third times as many teeth per comb as a single head, and two-thirds times as many magnetic teeth per comb as a double head, but it produces an image which is substantially continuous, and therefore of much higher quality than that which can be obtained by either a single or double head. That is, when the magnetic image is composed of distinct interleaved recordings where the adjacent recordings are always in the opposite transverse directions, the recorded magnetic dots may be spaced much closer together and then substantially continuously inked with magnetic toner to provide a bolder, higher contrast and more readable and higher resolution image than can be achieved with planar zig-zag driving circuits and either a single or double magnetic comb construction. The invention has actually been reduced to practice by using a stack of three magnetic combs having 80 gaps per inch. The offset for each 80-gap comb is 1/240 inch. In general, this offset should be such that the magnetization produced by one set of the like-ordered gaps does not overlap that produced by an adjacent set of like-ordered gaps.

Furthermore, instead of using identical winding patterns for the drive circuits of all the sub-assemblies 12, 14 and 16 and then driving the middle sub-assembly 14 with currents in directions opposite to those used for the sub-assemblies 12 and 16, one may merely use the opposite or complementary winding pattern for the middle sub-assembly and then drive all the sub-assemblies with unidirectional currents of the same polarity, thus obtaining the same magnetization and collector toner patterns shown in FIG. 6B.

While this invention has been described with reference to particular embodiments and examples, in view of the above teachings, other modifications and variations will occur to those skilled in the art. Accordingly, it should be understood that the scope of the invention is defined by the following claims.

We claim:

1. A magnetic printing head of the type having a comb-type magnetic recording head assembly extending transversely of the direction of a moving magnetic medium upon which magnetic printing is to be produced by the head, the improvement comprising:

an odd plurality of magnetic combs stacked in the direction of the moving medium and offset relative to each other in the direction transverse to the direction of the moving tape;

and magnetic field-generating means for creating magnetic fields in opposite transverse directions both in adjacent gaps of individual combs and also in like-ordered gaps of adjacent combs.

2. The improvement of claim 1 wherein said field-generating means comprises unidirectional current-carrying conductor means threaded in opposite directions through adjacent gaps of individual combs such that the magnetic fields generated in adjacent gaps of each comb are in opposite transverse directions, and such that the magnetic fields generated in like-ordered gaps of adjacent combs are also in opposite transverse directions.

3. The improvement of claim 3 wherein said conductor means comprises individually driven word and digit conductors threaded in zig-zag fashion through the gaps of each of said combs.

4. The improvement of claim 3 wherein each of said conductor means comprises a flexible circuit board on the opposite sides of which are printed said word and digit conductors, said flexible board having an elongated slot through which the teeth of a magnetic comb protrude and across which the printed conductors extend.

5. The improvement of claim 3 wherein said conductor means on adjacent ones of said stacked magnetic combs are threaded in opposite directions through like-ordered gaps of the adjacent combs.

6. The improvement of claim 3 wherein said conductor means are threaded in the same directions through the gaps of all of said combs, and wherein unidirectional current flows in opposite directions through the conductor means on adjacent combs.

7. The improvement of claim 1 wherein said combs are spaced apart in the direction of the moving tape and staggered relative to each other a fraction of the pole-to-pole spacing, 1/(number of combs × number of poles per inch).

* * * * *